US012754284B2

(12) United States Patent
Kim et al.

(10) Patent No.: US 12,754,284 B2
(45) Date of Patent: Oct. 6, 2026

(54) UWB RADAR DEVICE FOR CORRECTING FREQUENCY ERROR AND SYNCHRONIZATION ERROR AND METHOD OF OPERATING THE SAME

(71) Applicant: Electronics and Telecommunications Research Institute, Daejeon (KR)

(72) Inventors: Yi-Gyeong Kim, Daejeon (KR); Kyung Hwan Park, Daejeon (KR); Sujin Park, Daejeon (KR); Young-deuk Jeon, Daejeon (KR); Min-Hyung Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 191 days.

(21) Appl. No.: 18/733,086

(22) Filed: Jun. 4, 2024

(65) Prior Publication Data

US 2025/0067841 A1 Feb. 27, 2025

(30) Foreign Application Priority Data

Aug. 22, 2023 (KR) ........................ 10-2023-0110106
Jan. 4, 2024 (KR) ........................ 10-2024-0001595

(51) Int. Cl.
*G01S 7/40* (2006.01)
*H01Q 5/25* (2015.01)

(52) U.S. Cl.
CPC .......... *G01S 7/4004* (2013.01); *G01S 7/4091* (2021.05); *H01Q 5/25* (2015.01)

(58) Field of Classification Search
CPC .... G01S 13/0209; G01S 7/032; G01S 7/4004; G01S 7/4008; G01S 7/4021; G01S 7/4091; H01Q 5/25
See application file for complete search history.

(56) References Cited

U.S. PATENT DOCUMENTS 7,916,799 B2 3/2011 Brink et al.
7,924,953 B2 4/2011 Choi et al.
(Continued)

FOREIGN PATENT DOCUMENTS

KR 10-2023-0079553 A 6/2023

OTHER PUBLICATIONS

Luong et al., "A Stitch in Time and Frequency Synchronization Saves Bandwidth", IPSN 2018, Apr. 2018, 12 pages.
(Continued)

*Primary Examiner* — Peter M Bythrow
(74) *Attorney, Agent, or Firm* — Sughrue Mion, PLLC

(57) ABSTRACT

Disclosed is an ultra-wide band (UWB) radar device including a first antenna circuit including a first transmission circuit, a first reception circuit, a first oscillator that supplies a first clock signal to the first transmission circuit and the first reception circuit, and a first frequency counter, a second antenna circuit including a second transmission circuit, a second reception circuit, a second oscillator that supplies a second clock signal to the second transmission circuit and the second reception circuit, and a second frequency counter, and a controller that detects the target. The controller corrects a frequency error between the first clock signal and the second clock signal and compensates for a synchronization error between the first antenna circuit and the second antenna circuit.

20 Claims, 13 Drawing Sheets

(56) References Cited

U.S. PATENT DOCUMENTS

| | | | | |
|---|---|---|---|---|
| 8,165,254 | B2 | 4/2012 | Shin et al. | |
| 10,129,841 | B2 | 11/2018 | Amizur et al. | |
| 10,509,104 | B1 * | 12/2019 | Dato | G01S 13/87 |
| 10,615,495 | B1 | 4/2020 | Loui | |
| 12,429,555 | B2 * | 9/2025 | Maher | G01S 7/354 |
| 2004/0189514 | A1 | 9/2004 | Schlick et al. | |
| 2009/0189820 | A1 | 7/2009 | Saito et al. | |
| 2021/0072349 | A1 * | 3/2021 | Mayer | G01S 7/4017 |
| 2022/0057482 | A1 | 2/2022 | Fritzin et al. | |
| 2022/0065986 | A1 * | 3/2022 | Vaucher | G01S 7/028 |
| 2022/0404456 | A1 * | 12/2022 | Gottinger | G01S 7/354 |
| 2024/0219515 | A1 * | 7/2024 | Wu | G01S 13/931 |

OTHER PUBLICATIONS

Nam et al., "Ranging Performance Evaluation of Relative Frequency Offset Compensation in High Rate UWB", UWB, vol. 9, No. 7, 2009, pp. 76-85.

* cited by examiner

UWB RADAR DEVICE FOR CORRECTING FREQUENCY ERROR AND SYNCHRONIZATION ERROR AND METHOD OF OPERATING THE SAME

CROSS-REFERENCE TO RELATED APPLICATIONS

This application claims priority under 35 U.S.C. § 119 to Korean Patent Application No. 10-2023-0110106 filed on Aug. 22, 2023, and No. 10-2024-0001595 filed on Jan. 4, 2024, in the Korean Intellectual Property Office, the disclosures of which are incorporated by reference herein in their entireties.

BACKGROUND

Embodiments of the present disclosure described herein relate to an ultra-wide band (UWB) radar device and a method of operating the same, and more particularly, relate to a UWB radar device for correcting a sampling frequency error and a synchronization error between antenna circuits, and a method of operating the same.

UWB radar refers to radar that detects a target through a phase difference by transmitting and receiving very short pulses of electromagnetic waves. The UWB radar is composed of a plurality of antenna circuits to increase spatial resolution.

In general, the plurality of antenna circuits are composed of identical components. Even in this case, the operating speed and latency of each of the antenna circuits may differ due to component deviation. The difference in the operating speed and latency between the antenna circuits cause phase errors in signals received by the antenna circuits, and the phase errors degrade the spatial resolution of the UWB radar.

SUMMARY

Embodiments of the present disclosure provide a UWB radar device that improves spatial resolution by correcting a sampling frequency error and a synchronization error between antenna circuits, and an operating method thereof.

According to an embodiment, an ultra-wide band (UWB) radar device includes a first antenna circuit including a first transmission circuit that transmits a first signal to a target based on a synchronization signal, a first reception circuit that generates pieces of first sampling data from the first signal reflected from the target, a first oscillator that supplies a first clock signal to the first transmission circuit and the first reception circuit, and a first frequency counter that obtains first frequency data of the first clock signal, a second antenna circuit including a second transmission circuit that transmits a second signal to the target based on the synchronization signal, a second reception circuit that generates pieces of second sampling data from the second signal reflected from the target, a second oscillator that supplies a second clock signal to the second transmission circuit and the second reception circuit, and a second frequency counter that obtains second frequency data of the second clock signal, and a controller that generates the synchronization signal and to detect the target based on the pieces of first sampling data and the pieces of second sampling data. The controller corrects a frequency error between the first clock signal and the second clock signal and compensates for a synchronization error between the first antenna circuit and the second antenna circuit.

According to an embodiment, a method of operating a UWB radar device includes detecting, by a controller, a frequency error between a first clock signal of a first antenna circuit and a second clock signal of a second antenna circuit, detecting, by the controller, a synchronization error between the first antenna circuit and the second antenna circuit, generating, by the first antenna circuit and the second antenna circuit, pieces of first sampling data and pieces of second sampling data, and correcting, by the controller, the frequency error and the synchronization error with respect to the pieces of first sampling data and the pieces of second sampling data.

BRIEF DESCRIPTION OF DRAWINGS

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the present disclosure.

Figure 1:
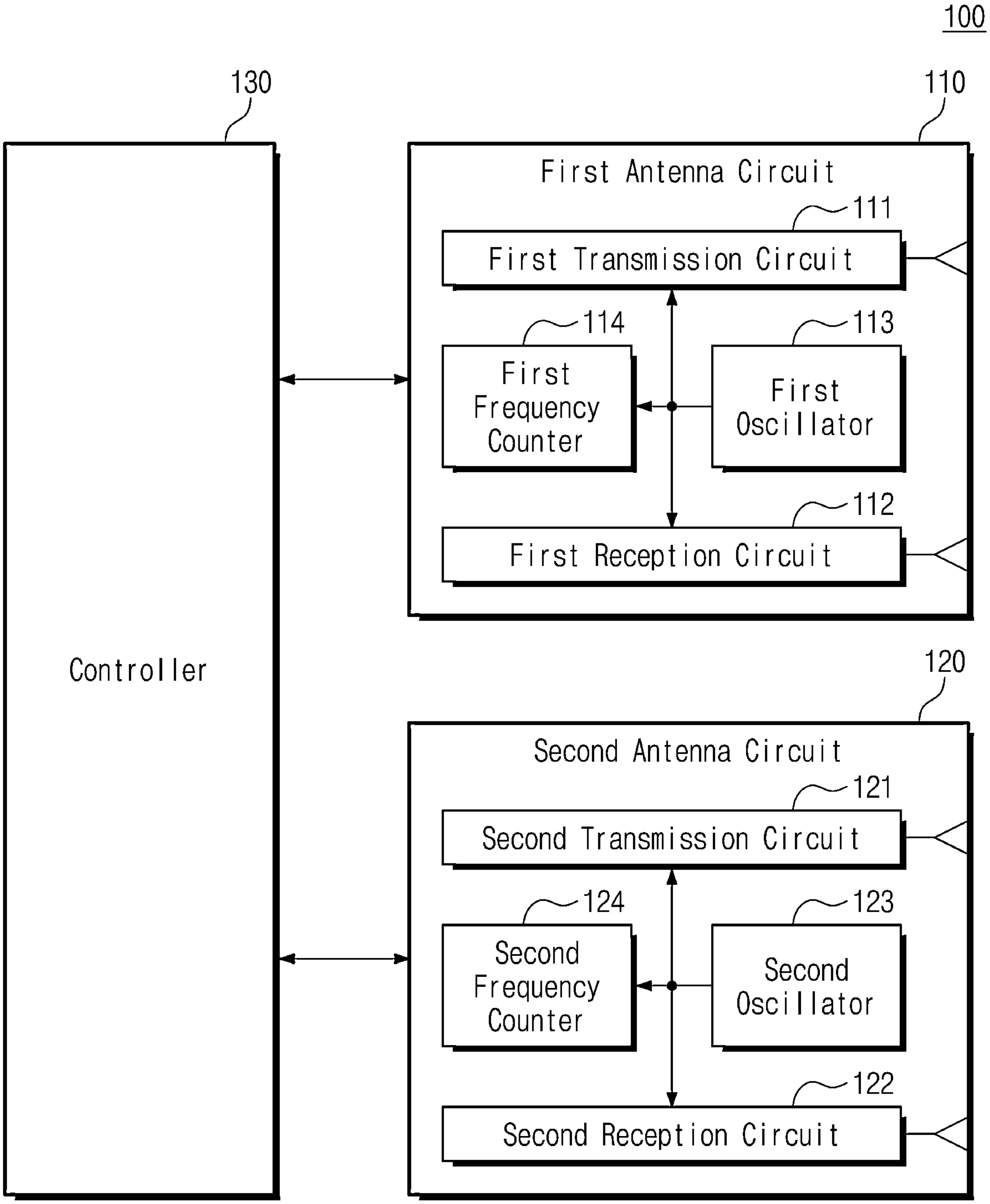
FIG. 1 shows a UWB radar device, according to an embodiment of the present disclosure.

FIG. 1 shows a UWB radar device 100, according to an embodiment of the present disclosure. Referring to FIG. 1, the UWB radar device 100 may include a first antenna circuit 110, a second antenna circuit 120, and a controller 130.

The first antenna circuit 110 may include a first transmission circuit 111, a first reception circuit 112, a first oscillator 113, and a first frequency counter 114.

The first transmission circuit 111 may be configured to transmit a first signal for detecting a target. For example, the first transmission circuit 111 may transmit the first signal to the target through an antenna based on a synchronization signal received from the controller 130. In this case, the first signal may be an electromagnetic wave with a very short pulse.

The first reception circuit 112 may be configured to receive the first signal (hereinafter, for convenience of description, it is referred to as a "first reception signal") reflected from the target. For example, the first reception circuit 112 may receive the first reception signal from the target through the antenna based on the synchronization signal received from the controller 130.

The first reception circuit 112 may generate pieces of first sampling data by sampling the first reception signal. The first reception circuit 112 may transmit the pieces of first sampling data to the controller 130.

The first oscillator 113 may supply a first clock signal to the first transmission circuit 111, the first reception circuit 112, and the first frequency counter 114. The first transmission circuit 111 may generate the first signal based on the first clock signal; the first reception circuit 112 may sample the first reception signal based on the first clock signal; and the first frequency counter 114 may count the number of pulses of the first clock signal.

The first frequency counter 114 may count the number of pulses of the first clock signal of the first oscillator 113. As the counted result, the first frequency counter 114 may obtain first frequency data for the first clock signal. The first frequency counter 114 may transmit the first frequency data to the controller 130.

In an embodiment, the first antenna circuit 110 may include a plurality of transmission circuits and a plurality of reception circuits.

The second antenna circuit 120 may include a second transmission circuit 121, a second reception circuit 122, a second oscillator 123, and a second frequency counter 124. In an embodiment, the second antenna circuit 120 may be composed of the same components as the first antenna circuit 110. For example, the second transmission circuit 121 may be composed of the same parts as the first transmission circuit 111; the second reception circuit 122 may be composed of the same components as the first reception circuit 112; the second oscillator 123 may be composed of the same parts as the first oscillator 113; and, the second frequency counter 124 may be composed of the same components as the first frequency counter 114.

The second transmission circuit 121 may be configured to transmit a second signal for detecting a target. For example, the second transmission circuit 121 may transmit the second signal to the target through an antenna based on a synchronization signal received from the controller 130. In this case, the second signal may be an electromagnetic wave with a very short pulse.

The second reception circuit 122 may be configured to receive the second signal (hereinafter, for convenience of description, it is referred to as a "second reception signal") reflected from the target. For example, the second reception circuit 122 may receive the second reception signal from the target through an antenna based on the synchronization signal received from the controller 130.

The second reception circuit 122 may generate pieces of second sampling data by sampling the second reception signal. The second reception circuit 122 may transmit the pieces of second sampling data to the controller 130.

The second oscillator 123 may supply a second clock signal to the second transmission circuit 121, the second reception circuit 122, and the second frequency counter 124. The second transmission circuit 121 may generate the second signal based on the second clock signal; the second reception circuit 122 may sample the second reception signal based on the second clock signal; and, the second frequency counter 124 may count the number of pulses of the second clock signal.

The second frequency counter 124 may count the number of pulses of the second clock signal of the second oscillator 123. As the counted result, the second frequency counter 124 may obtain second frequency data for the second clock signal. The second frequency counter 124 may transmit the second frequency data to the controller 130.

In an embodiment, the second antenna circuit 120 may include a plurality of transmission circuits and a plurality of reception circuits.

The controller 130 may be configured to control overall operations of the UWB radar device 100. In an embodiment, the UWB radar device 100 may perform various calculation operations or may require the driving of software to detect the target. The controller 130 may be configured to perform various calculation operations required by the UWB radar device 100 or to operate pieces of software.

For example, the controller 130 may detect a target based on pieces of data received from the first antenna circuit 110 and the second antenna circuit 120.

For example, the controller 130 may perform various calculation operations for correcting the sampling frequency error and synchronization error between the first antenna circuit 110 and the second antenna circuit 120.

The controller 130 may exchange various signals with the first antenna circuit 110 and the second antenna circuit 120. For example, the controller 130 may output a synchronization signal to the first antenna circuit 110 and the second antenna circuit 120. The first antenna circuit 110 and the second antenna circuit 120 may operate based on the synchronization signal.

Although not shown, the UWB radar device 100 may include an additional memory. The memory may store various pieces of data generated from the first antenna circuit 110, the second antenna circuit 120, and the controller 130.

Figure 2:
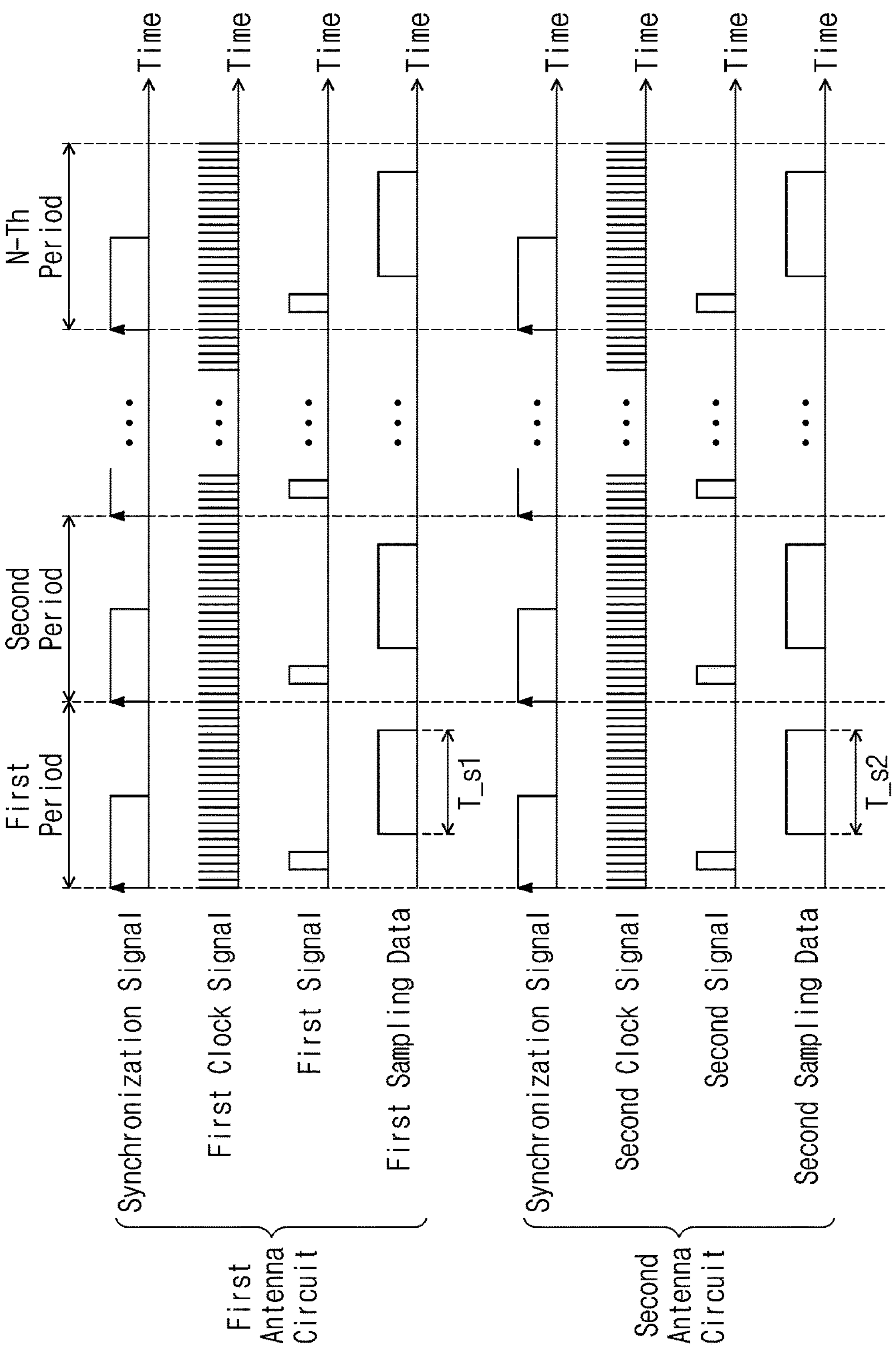
FIG. 2 shows an example of an operation of a UWB radar device, according to an embodiment of the present disclosure.

FIG. 2 shows an example of an operation of the UWB radar device 100, according to an embodiment of the present disclosure. Referring to FIGS. 1 and 2, the first antenna circuit 110 and the second antenna circuit 120 may receive a synchronization signal from the controller 130 during first to n-th periods (where 'n' is a natural number greater than 1). The first antenna circuit 110 and the second antenna circuit 120 may operate based on the synchronization signal.

For example, during the first period, the first antenna circuit 110 may receive the synchronization signal from the controller 130. The first oscillator 113 may supply a first clock signal to the first transmission circuit 111 and the first reception circuit 112. After a period of time (e.g., a first time) from a time point of receiving the synchronization signal, the first transmission circuit 111 may generate a first signal based on the first clock signal, and may transmit the generated first signal to the target. After a period of time (e.g., a second time) from the time point of receiving the synchronization signal, the first reception circuit 112 may receive the first reception signal. The first reception circuit 112 may sample the first reception signal during a first sampling time T_s1 based on the first clock signal and may generate pieces of first sampling data. The first reception circuit 112 may transmit the generated pieces of first sampling data to the controller 130.

The second antenna circuit 120 may receive the synchronization signal from the controller 130. The second oscillator 123 may supply a second clock signal to the second transmission circuit 121 and the second reception circuit 122. After a period of time (e.g., a first time) from a time point of receiving the synchronization signal, the second transmission circuit 121 may generate a second signal based on the second clock signal, and may transmit the generated second signal to the target. After a period of time (e.g., a second time) from the time point of receiving the synchronization signal, the second reception circuit 122 may receive the second reception signal. The second reception circuit 122 may sample the second reception signal during a second sampling time T_s2 based on the second clock signal and may generate pieces of second sampling data. The second reception circuit 122 may transmit the generated pieces of second sampling data to the controller 130.

An operation of the UWB radar device 100 during the second to n-th periods is the same as an operation of the UWB radar device 100 during the first period described above. Thus, additional description will be omitted to avoid redundancy.

In the meantime, even though the first oscillator 113 and the second oscillator 123 are composed of the same parts, frequencies of the first clock signal and the frequency of the second clock signal may be different from each other due to component deviation. The frequency error between the first clock signal and the second clock signal causes a difference between the first sampling time T_s1 and the second sampling time T_s2. The UWB radar device 100 may perform operations for correcting the frequency error. This will be more fully described with reference to FIGS. 3 to 7.

Figure 3:
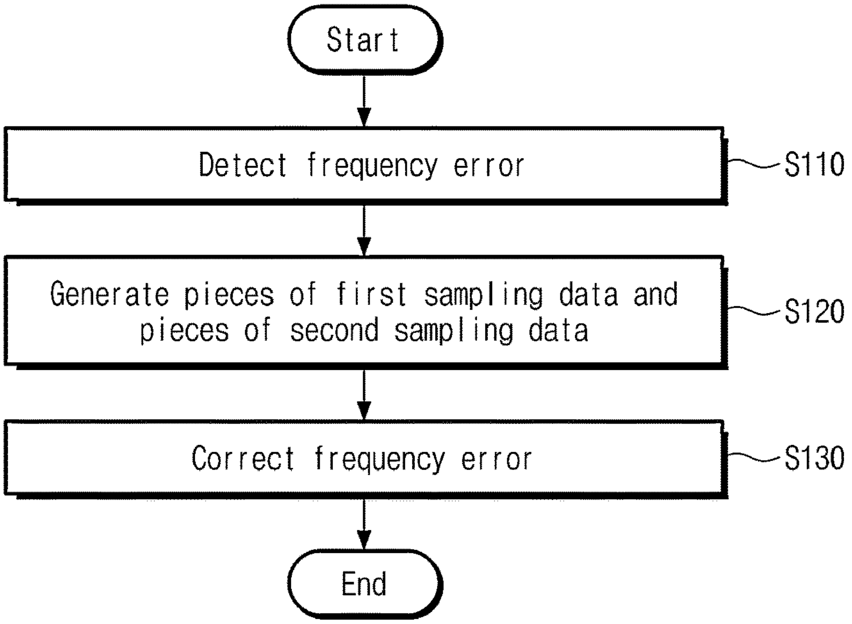
FIG. 3 shows an example of a method in which a UWB radar device corrects a frequency error, according to an embodiment of the present disclosure.

FIG. 3 shows an example of a method in which the UWB radar device 100 corrects a frequency error, according to an embodiment of the present disclosure. Referring to FIGS. 1 to 3, the UWB radar device 100 may perform operations S110 to S130.

In operation S110, the UWB radar device 100 may detect a frequency error between a first clock signal and a second clock signal. For example, the UWB radar device 100 may obtain first frequency data based on the first clock signal and may obtain second frequency data based on the second clock signal. The UWB radar device 100 may detect a frequency error based on the obtained first frequency data and the obtained second frequency data. In an embodiment, the UWB radar device 100 may store the detected frequency error in a memory (not shown).

In operation S120, the UWB radar device 100 may generate pieces of first sampling data and pieces of second sampling data.

For example, during the first to n-th periods, the first antenna circuit 110 may transmit a first signal to a target based on a synchronization signal. The first antenna circuit 110 may receive a first reception signal. The first antenna circuit 110 may generate the pieces of first sampling data by sampling the first reception signal. The first antenna circuit 110 may transmit the pieces of first sampling data to the controller 130.

For example, during the first to n-th periods, the second antenna circuit 120 may transmit a second signal to the target based on the synchronization signal. The second antenna circuit 120 may receive a second reception signal. The second antenna circuit 120 may generate the pieces of second sampling data by sampling the second reception signal. The second antenna circuit 120 may transmit the pieces of second sampling data to the controller 130.

In operation S130, the UWB radar device 100 may correct the frequency error. For example, the UWB radar device 100 may interpolate the pieces of second sampling data in a time domain as much as the frequency error to correct the frequency error.

Figure 4:
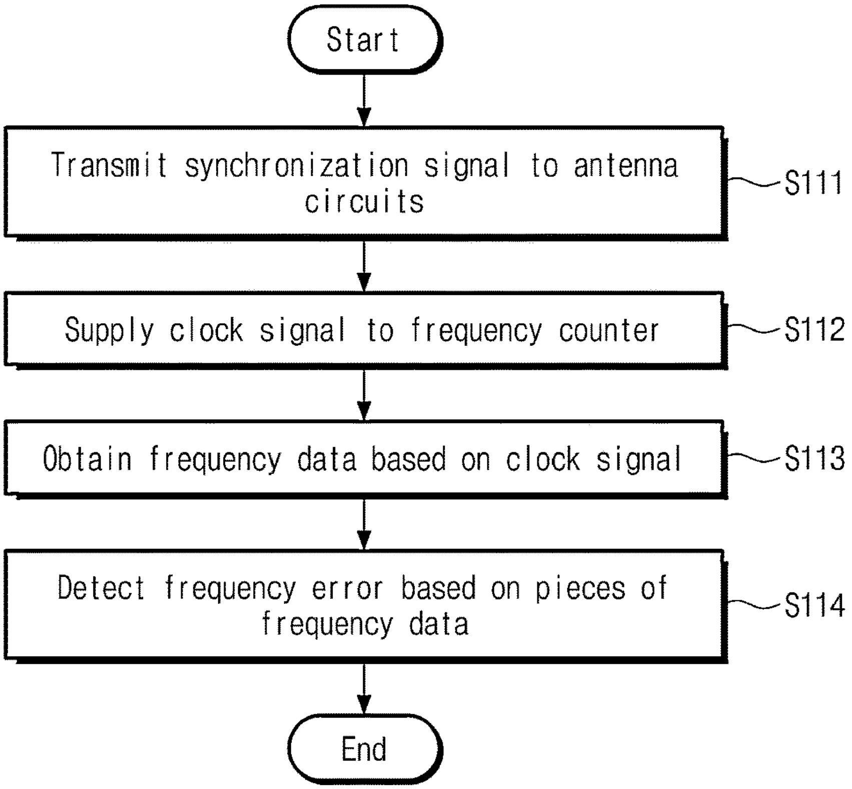
FIG. 4 shows an example of an operation of detecting the frequency error of FIG. 3.

FIG. 4 shows an example of an operation S110 of detecting the frequency error of FIG. 3.

Referring to FIGS. 1, 3, and 4, the UWB radar device 100 may perform operations S111 to S114.

In operation S111, the controller 130 may output a synchronization signal to the antenna circuits 110 and 120. For example, during first to n-th periods, the controller 130 may output the synchronization signal to the first antenna circuit 110 and the second antenna circuit 120.

In an embodiment, the controller 130 may output an enable signal along with the synchronization signal to the antenna circuits 110 and 120. In this case, each of the frequency counters 114 and 124 may operate depending on the level of the enable signal.

For example, the controller 130 may output the first enable signal along with the synchronization signal to the first antenna circuit 110. For example, the controller 130 may output the second enable signal along with the synchronization signal to the second antenna circuit 120.

In operation S112, each oscillator may supply a clock signal to a frequency counter. For example, the first oscillator 113 may supply the first clock signal to the first frequency counter 114, and the second oscillator 123 may supply the second clock signal to the second frequency counter 124.

In operation S113, each frequency counter may obtain frequency data based on the clock signal. For example, the first frequency counter 114 may obtain first frequency data for the first clock signal by counting the number of pulses of the first clock signal. The second frequency counter 124 may obtain second frequency data for the second clock signal by counting the number of pulses of the second clock signal. The first frequency counter 114 and the second frequency counter 124 may transmit the first frequency data and the second frequency data to the controller 130.

In an embodiment, each frequency counter may operate based on the enable signal received from the controller 130.

For example, when a first enable signal is at a high level, the first frequency counter 114 may count the number of pulses of the first clock signal. When the first enable signal is at a low level, the first frequency counter 114 may not count the number of pulses of the first clock signal.

For example, when a second enable signal is at a high level, the second frequency counter 124 may count the number of pulses of the second clock signal. When the second enable signal is at a low level, the second frequency counter 114 may not count the number of pulses of the second clock signal.

In operation S114, the controller 130 may detect a frequency error based on pieces of frequency data. For example, the controller 130 may detect the frequency error between the first clock signal and the second clock signal based on the first frequency data and the second frequency data. In an embodiment, the controller 130 may store the detected frequency error in a memory (not shown).

Figure 5:
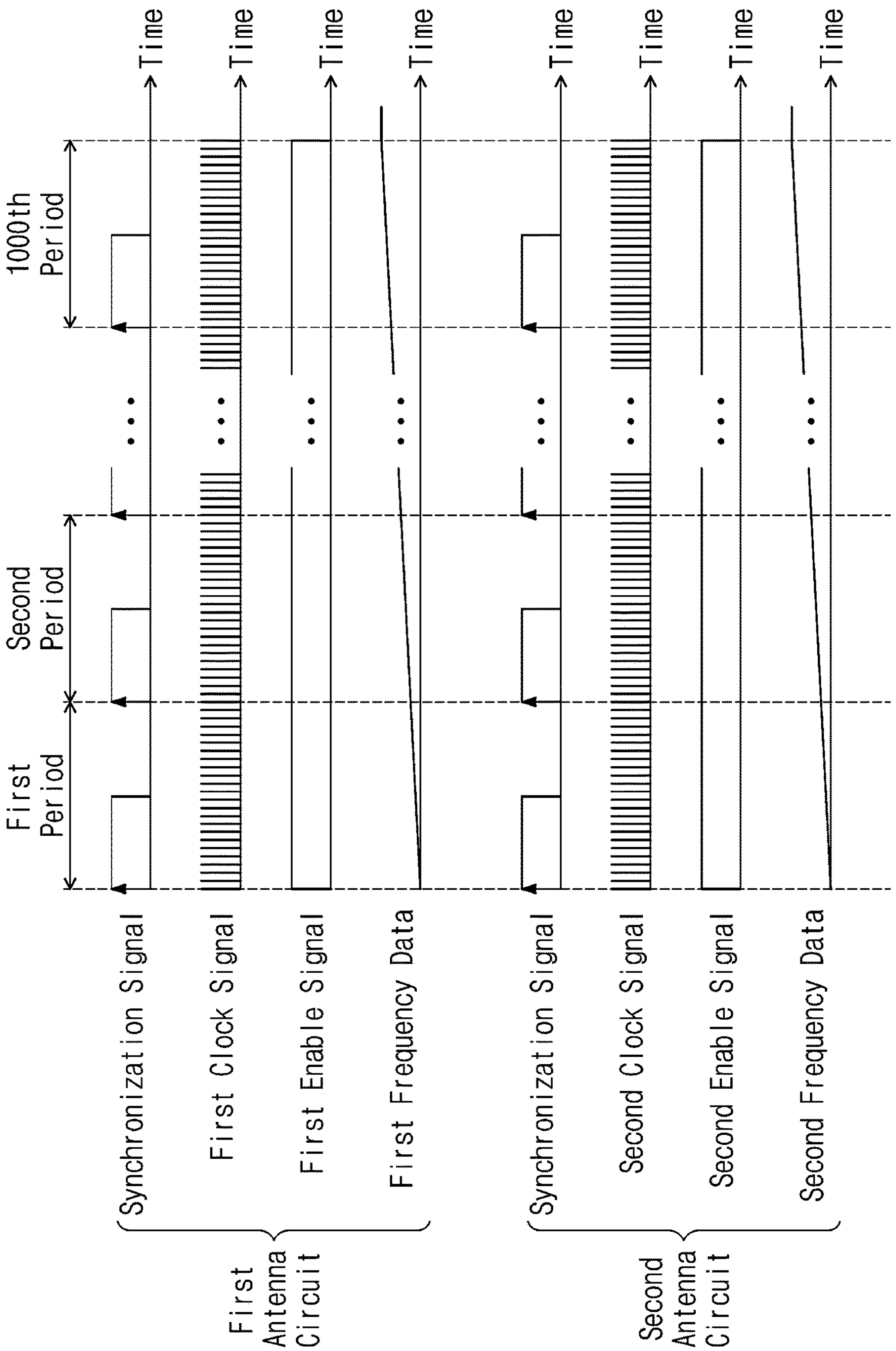
FIG. 5 shows an example of an operation, in which a UWB radar device detects a frequency error, according to an embodiment of the present disclosure.

FIG. 5 shows an example of an operation, in which the UWB radar device 100 detects a frequency error, according to an embodiment of the present disclosure. In FIG. 5, it is assumed that the frequency of a synchronization signal is '1 MHz'; the frequency of a first clock signal is '12.8 GHz', the frequency of a second clock signal is '12.8 GHz+12.8 kHz'; and 'n' is '1000'.

Referring to FIGS. 1 and 3 to 5, each of the first antenna circuit 110 and the second antenna circuit 120 may generate frequency data based on the synchronization signal received from the controller 130.

For example, during first to 1000th periods, the first antenna circuit 110 may receive the synchronization signal and a first enable signal. During the first to 1000th periods, the first enable signal may be at a high level. The first oscillator 113 may supply the first clock signal to the first frequency counter 114. The first frequency counter 114 may obtain first frequency data for the first clock signal by counting the number of pulses of the first clock signal during the first to 1000th periods with respect to the first clock signal. At this time, a value of the first frequency data may be '1000*12.8 GHz'. The first frequency counter 114 may transmit the first frequency data to the controller 130.

For example, during the first to 1000th periods, the second antenna circuit 120 may receive the synchronization signal and a second enable signal. During the first to 1000th periods, the second enable signal may be at a high level. The second oscillator 123 may supply the second clock signal to the second frequency counter 124. The second frequency counter 124 may obtain second frequency data for the second clock signal by counting the number of pulses of the second clock signal during the first to 1000th periods with respect to the second clock signal. At this time, a value of the second frequency data may be '1000*(12.8 GHz+12.8 kHz)'. The second frequency counter 124 may transmit the second frequency data to the controller 130.

The controller 130 may receive the first frequency data and the second frequency data. The controller 130 may detect a frequency error between the first clock signal and the second clock signal based on the first frequency data and the second frequency data.

Figure 6:
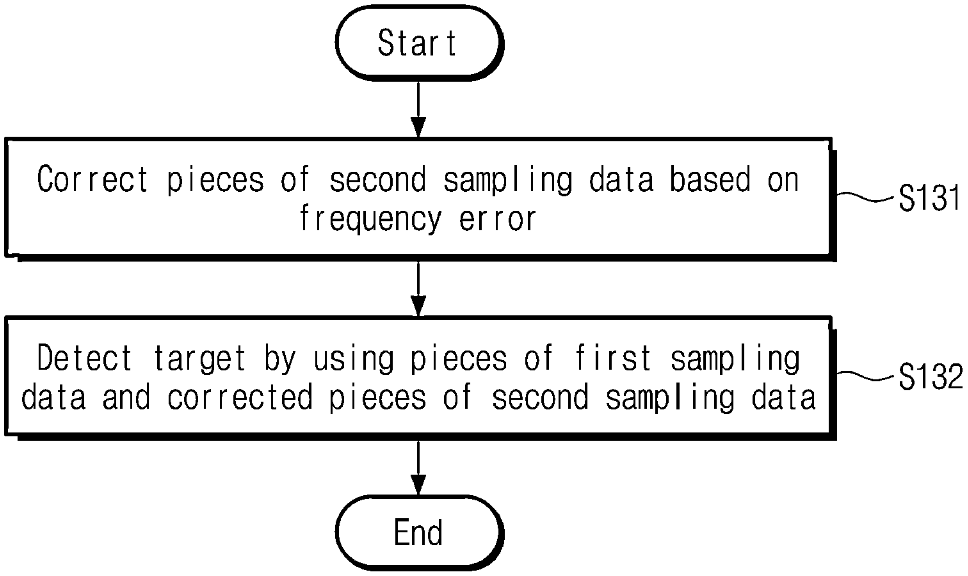
FIG. 6 shows an example of an operation of correcting the frequency error of FIG. 3.

FIG. 6 shows an example of an operation S130 of correcting the frequency error of FIG. 3.

Referring to FIGS. 1, 3, and 6, the UWB radar device 100 may perform operations S131 and S132.

In operation S131, the controller 130 may correct pieces of second sampling data based on the detected frequency error. For example, the controller 130 may interpolate the pieces of second sampling data in a time domain as much as the detected frequency error In operation S132, the controller 130 may detect a target by using pieces of first sampling data and the corrected pieces of second sampling data.

Figure 7:
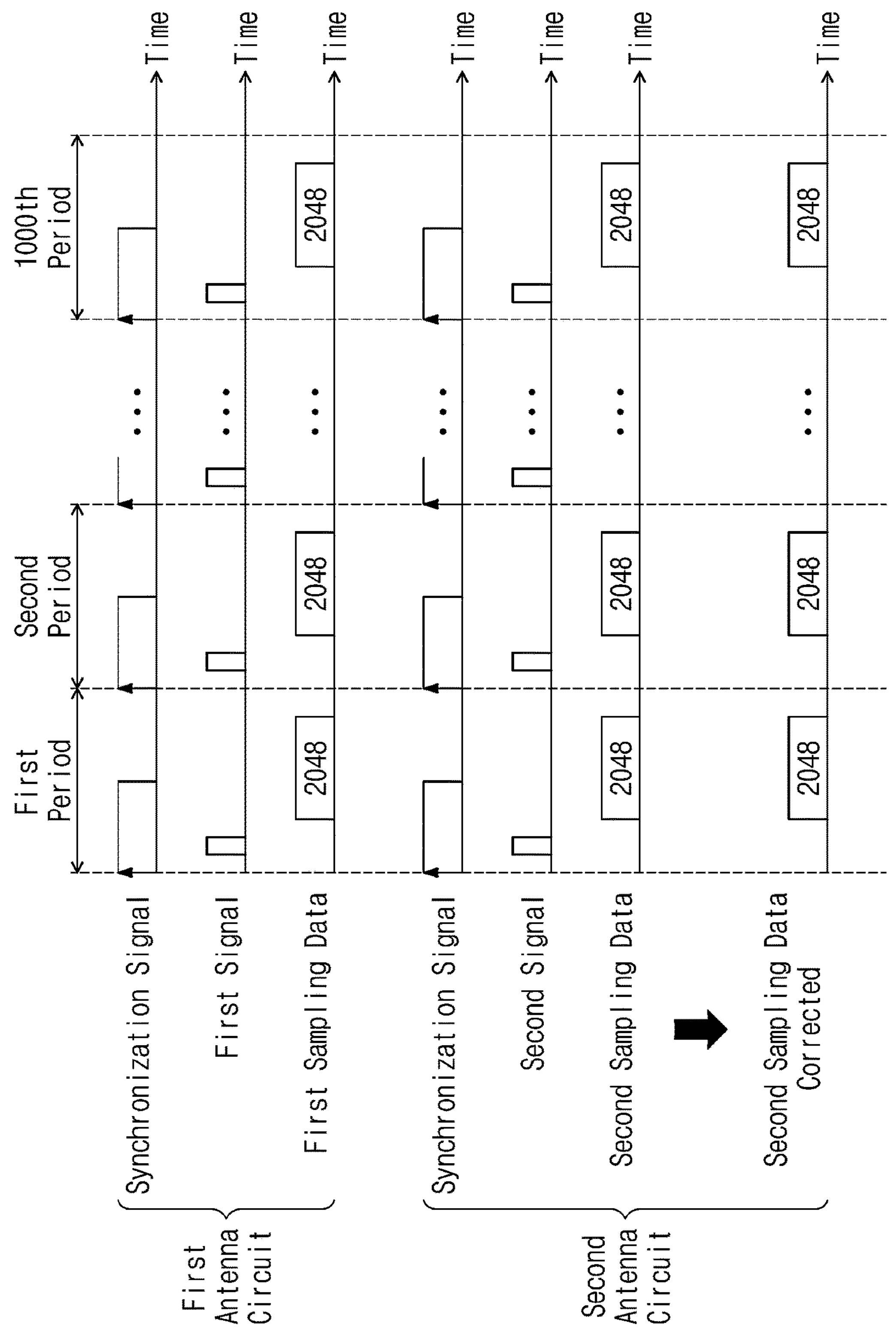
FIG. 7 shows an example of an operation in which a UWB radar device corrects a frequency error, according to an embodiment of the present disclosure.

FIG. 7 shows an example of an operation in which the UWB radar device 100 corrects a frequency error, according to an embodiment of the present disclosure. In FIG. 7, it is assumed that the frequency of a synchronization signal is '1 MHz'; the frequency of a first clock signal is '12.8 GHz', the frequency of a second clock signal is '12.8 GHz+12.8 kHz'; and 'n' is '1000'.

Referring to FIGS. 1, 3, and 5 to 7, the first antenna circuit 110 may generate 2048 pieces of first sampling data based on the synchronization signal for each period. The second antenna circuit 120 may generate 2048 pieces of second sampling data based on the synchronization signal for each period. The first antenna circuit 110 and the second antenna circuit 120 may transmit the generated pieces of first sampling data and the generated pieces of second sampling data to the controller 130.

The controller 130 may correct the pieces of second sampling data based on the detected frequency error. For example, the controller 130 may interpolate the pieces of second sampling data in a time domain as much as the detected frequency error by using the frequency of the first clock signal as a reference frequency. In FIG. 5, a value of the first frequency data is '1000*12.8 GHz', and a value of second frequency data is '1000*(12.8 GHz+12.8 kHz)'. Accordingly, the controller 130 may interpolate the pieces of second sampling data in a time domain as much as '(12.8 GHz+12.8 kHz)*(1.0-1.0e-6)'.

The controller 130 may detect the target by using the pieces of first sampling data and the corrected pieces of second sampling data.

Figure 8:
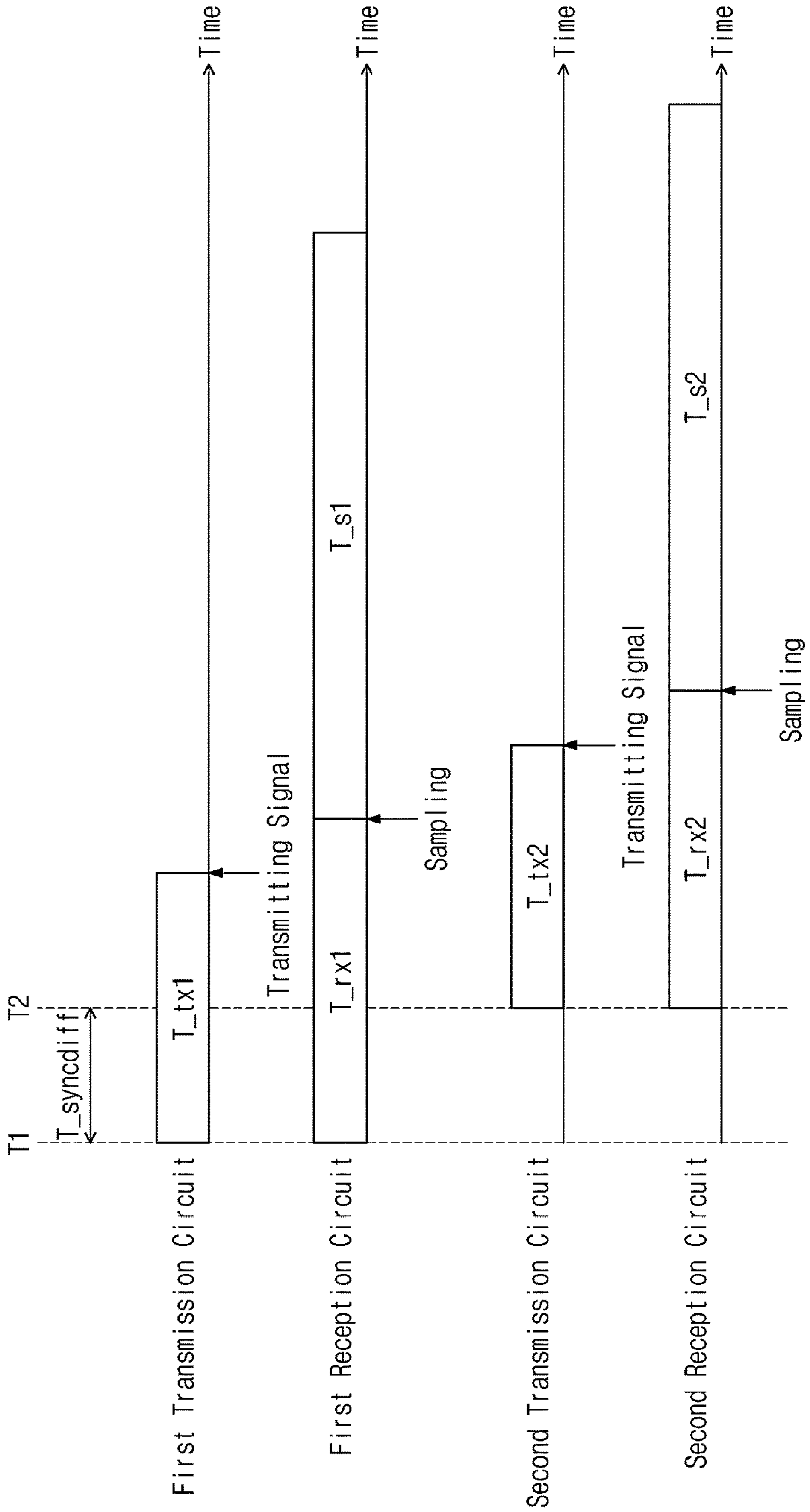
FIG. 8 shows an example of an operation before a UWB radar device corrects a synchronization error, according to an embodiment of the present disclosure.

FIG. 8 shows an example of an operation before the UWB radar device 100 corrects a synchronization error, according to an embodiment of the present disclosure. Referring to FIGS. 1 and 8, even though the controller 130 simultaneously outputs a synchronization signal to the first antenna circuit 110 and the second antenna circuit 120 for each period, there may be a synchronization error between the first antenna circuit 110 and the second antenna circuit 120 due to component deviation.

In detail, the first antenna circuit 110 may receive the synchronization signal at a first time point T1. The second antenna circuit 120 may receive the synchronization signal at a second time point T2. The first time point T1 and the second time point T2 may differ by a synchronization signal error T_syncdiff.

The first transmission circuit 111 may transmit, to the target, the first signal, which is delayed by a first transmission circuit latency T_tx1 from the first time point T1. The first reception circuit 112 may sample the first reception signal, which is delayed by a first reception circuit latency T_rx1 from the first time point T1, during the first sampling time T_s1.

The second transmission circuit 121 may transmit, to the target, the second signal, which is delayed by a second transmission circuit latency T_tx2 from the second time point T2. The second reception circuit 122 may sample the second reception signal, which is delayed by a second reception circuit latency T_rx2 from the second time point T2, during the second sampling time T_s2.

There may be a synchronization error between the first antenna circuit 110 and the second antenna circuit 120 due to the above-described synchronization signal error T_syncdiff and latencies of the transmission circuits 111 and 121 and the reception circuits 112 and 122. The UWB radar device 100 may perform an operation for correcting the synchronization error. This will be more fully described with reference to FIGS. 9 to 12A-12B.

Figure 9:
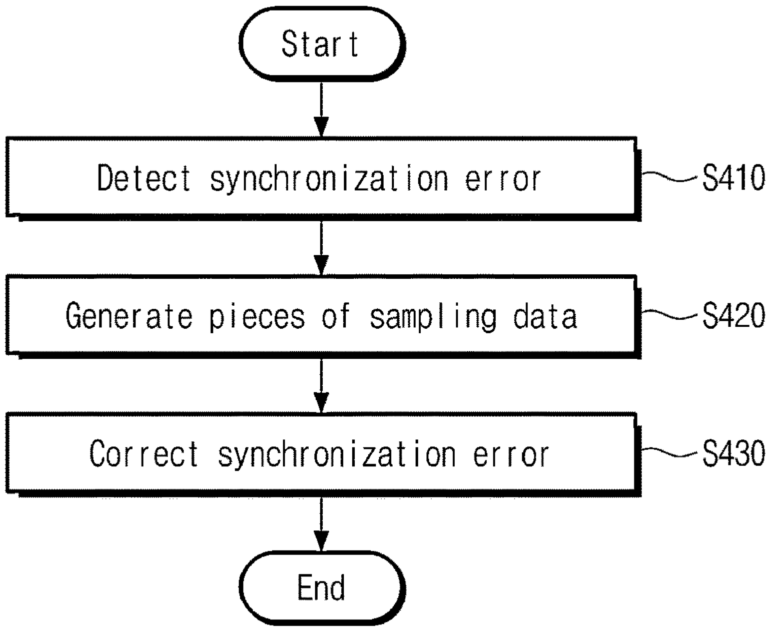
FIG. 9 shows an example of a method, in which a UWB radar device corrects a synchronization error, according to an embodiment of the present disclosure.

FIG. 9 shows an example of a method, in which the UWB radar device 100 detects a synchronization error, according to an embodiment of the present disclosure. Referring to FIGS. 1 and 9, the UWB radar device 100 may perform operations S410 to S430.

In operation S410, the UWB radar device 100 may detect a synchronization error between the first antenna circuit 110 and the second antenna circuit 120. For example, the UWB radar device 100 may calculate latencies of the transmission circuits 111 and 121 and the reception circuits 112 and 122 and may detect the synchronization error based on the latencies.

In operation S420, the UWB radar device 100 may generate pieces of sampling data and pieces of sampling data. For example, during the first to n-th periods, the first antenna circuit 110 may generate pieces of first sampling data based on the synchronization signal. The first antenna circuit 110 may transmit the pieces of first sampling data to the controller 130.

For example, during the first to n-th periods, the second antenna circuit 120 may generate pieces of second sampling data based on the synchronization signal. The second antenna circuit 120 may transmit the pieces of second sampling data to the controller 130.

In operation S430, the UWB radar device 100 may correct the synchronization error between the first antenna circuit 110 and the second antenna circuit 120. For example, the UWB radar device 100 may correct the pieces of first sampling data and the pieces of second sampling data based on calculated latencies.

Figure 10:
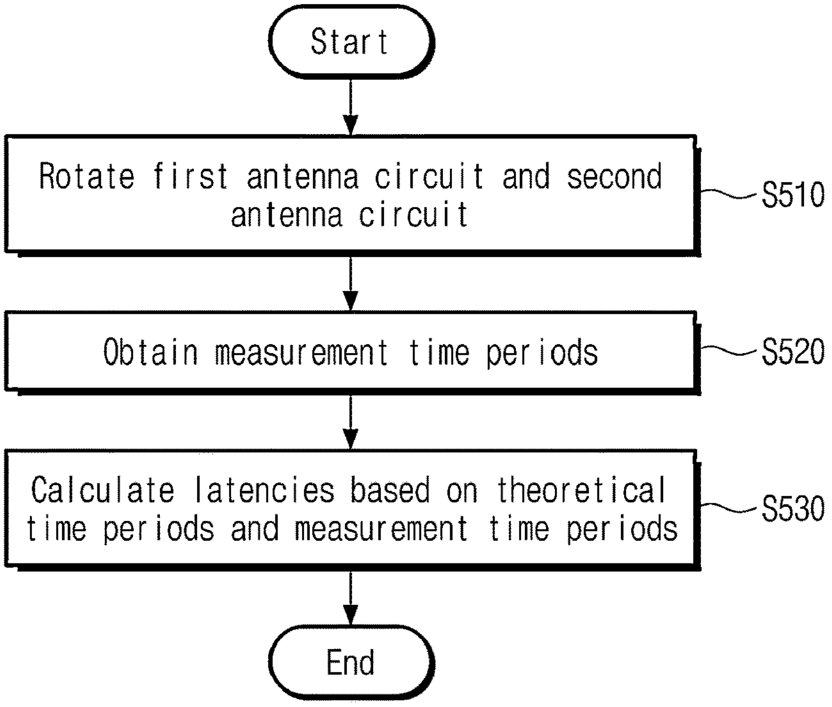
FIG. 10 shows an example of an operation of detecting a synchronization error in FIG. 9.

FIG. 10 shows an example of an operation S410 of detecting a synchronization error in FIG. 9. Referring to FIGS. 1, 9, and 10, the UWB radar device 100 may perform operations S510 to S530.

In operation S510, the UWB radar device 100 may rotate the first antenna circuit 110 and the second antenna circuit 120. For example, the UWB radar device 100 may rotate the first antenna circuit 110 and the second antenna circuit 120 to face each other.

In operation S520, the UWB radar device 100 may obtain measurement time periods. For example, the UWB radar device 100 may measure first to fourth measurement time periods, which are time periods required to send signals, based on the transmission and reception of signals between the antenna circuits 110 and 120, which face each other.

In operation S530, the UWB radar device 100 may calculate latencies of the transmission circuits 111 and 121 and the reception circuits 112 and 122 based on theoretical time periods and measurement time periods.

For example, the UWB radar device 100 may obtain theoretical time periods, which are values derived theoretically from a time required to send signals between the antenna circuits 110 and 120, based on an interval between the antenna circuits 110 and 120, and shapes of the antenna circuits 110 and 120. The UWB radar device 100 may calculate latencies of the transmission circuits 111 and 121 and the reception circuits 112 and 122 based on theoretical time periods and measurement time periods. In an embodiment, the UWB radar device 100 may store the calculated latencies in a memory (not shown).

Figure 11:
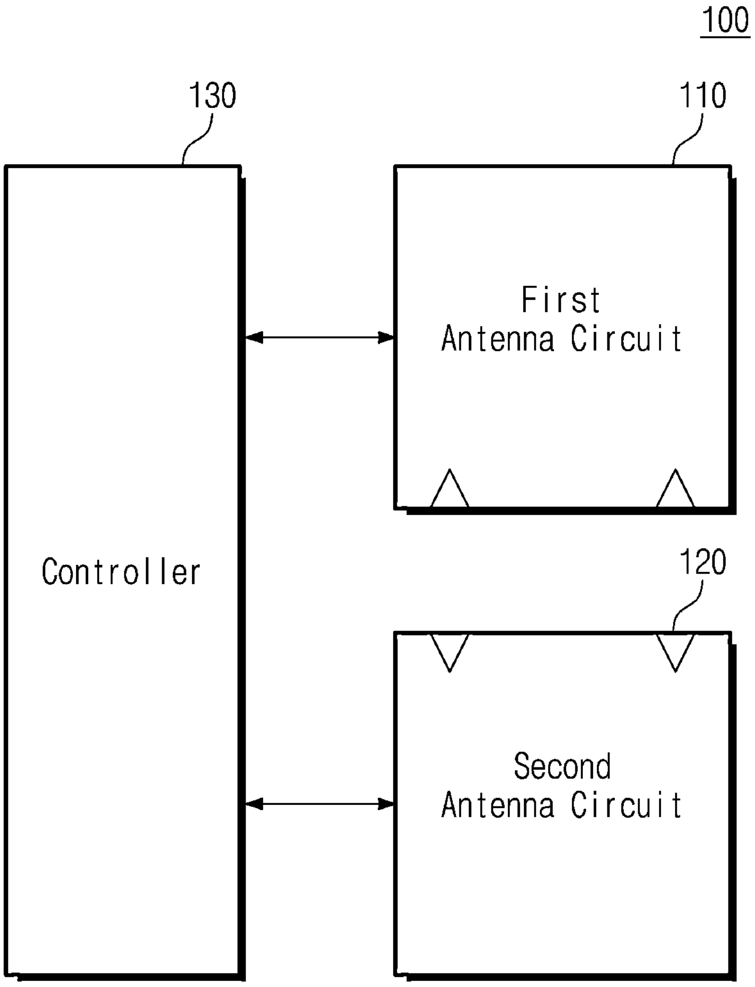
FIG. 11 shows an example of an operation, in which a UWB radar device detects a synchronization error, according to an embodiment of the present disclosure.

FIG. 11 shows an example of an operation, in which the UWB radar device 100 detects a synchronization error, according to an embodiment of the present disclosure. Referring to FIGS. 1 and 9 to 11, the controller 130 may rotate the first antenna circuit 110 and the second antenna circuit 120 to face each other. The first antenna circuit 110 and the second antenna circuit 120 may transmit and receive signals while facing each other, and may measure first to fourth measurement time periods, which are time periods required to send signals.

For example, the first transmission circuit 111 of the first antenna circuit 110 may transmit a first signal to the second antenna circuit 120. The first reception circuit 112 of the first antenna circuit 110 may measure a first measurement time period, which is a time required to send the first signal to the first reception circuit 112 after the first signal reaches the second antenna circuit 120 from the first transmission circuit 111, by receiving the first signal reflected from the second antenna circuit 120. At the same time, the second reception circuit 122 of the second antenna circuit 120 may measure a second measurement time period, which is a time required for the first signal to reach the second reception circuit 122 from the first transmission circuit 111, by receiving the first signal.

For example, the second transmission circuit 121 of the second antenna circuit 120 may transmit a second signal to the first antenna circuit 110. The second reception circuit 122 of the second antenna circuit 120 may measure a third measurement time period, which is a time required to send the second signal to the second reception circuit 122 after the second signal reaches the first antenna circuit 110 from the second transmission circuit 121, by receiving the second signal reflected from the first antenna circuit 110. At the same time, the first reception circuit 112 of the first antenna circuit 110 may measure a fourth measurement time period, which is a time required for the second signal to reach the first reception circuit 112 from the second transmission circuit 121, by receiving the second signal.

The first antenna circuit 110 and the second antenna circuit 120 may transmit the first to fourth measurement time periods to the controller 130.

The controller 130 may obtain theoretical time periods, which are values derived theoretically from a time required to send signals between the antenna circuits 110 and 120, based on an interval between the antenna circuits 110 and 120, and shapes of the antenna circuits 110 and 120.

For example, the controller 130 may obtain the first theoretical time period, which is a theoretical value derived from a time required to send the first signal to the first reception circuit 112 after the first signal reaches the first transmission circuit 111 to the second antenna circuit 120.

For example, the controller 130 may obtain the second theoretical time period, which is a theoretical value derived from a time required to send the first signal from the first transmission circuit 111 to the second reception circuit 122.

The controller 130 may calculate latencies of the transmission circuits 111 and 121 and the reception circuits 112 and 122 based on theoretical time periods and measurement time periods. For example, the controller 130 may calculate the latencies of the transmission circuits 111 and 121 and the reception circuits 112 and 122 based on a first theoretical time period, a second theoretical time period, a first measurement time period, a second measurement time period, a third measurement time period, and a fourth measurement time period. The controller 130 may detect a synchronization error between the antenna circuits 110 and 120 based on calculated latencies.

Figure 12A:
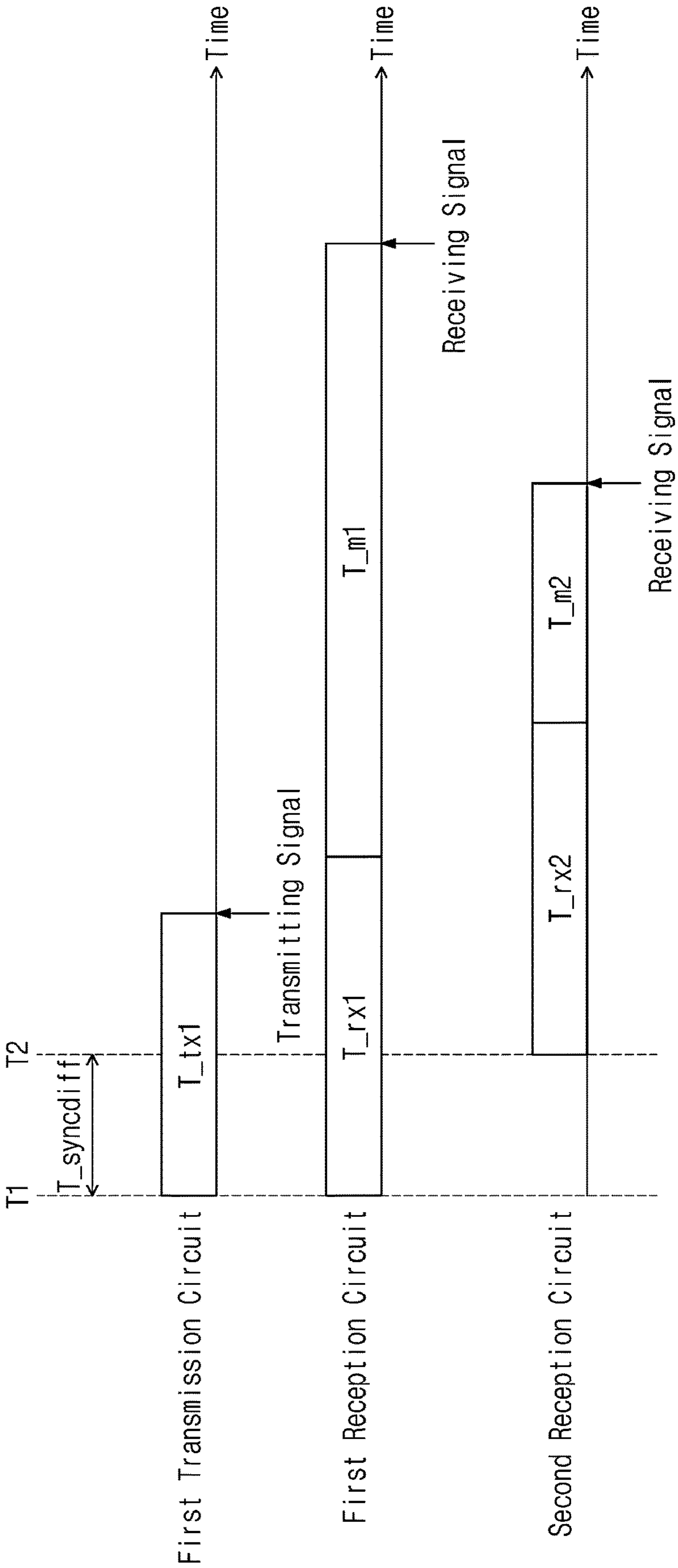
FIGS. 12A and 12B show examples of an operation, in which a UWB radar device calculates latencies, according to an embodiment of the present disclosure.
Figure 12B:
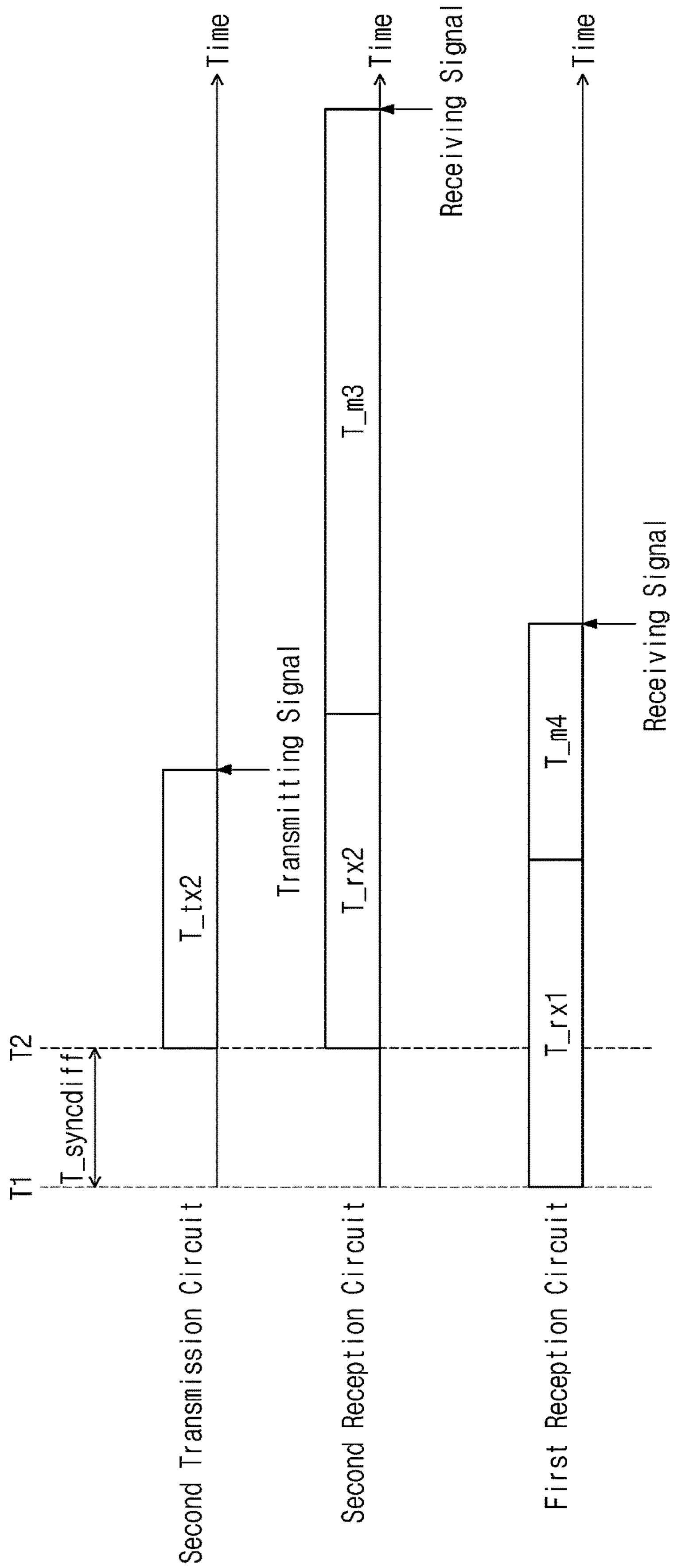

FIGS. 12A and 12B show an example of an operation, in which the UWB radar device 100 calculates latencies T_tx1, T_rx1, T_tx2, and T_rx2, according to an embodiment of the present disclosure. In FIGS. 12A and 12B, it is assumed that the first antenna circuit 110 receives a synchronization signal at the first time point T1, the second antenna circuit 120 receives the synchronization signal at the second time point T2, the first time point T1 and the second time point T2 differ by the synchronization signal error T_syncdiff, and the first antenna circuit 110 and the second antenna circuit 120 face each other.

Referring to FIGS. 9 to 12A, the first transmission circuit 111 may transmit, to the second antenna circuit 120, a first signal delayed by the first transmission circuit latency T_tx1 from the first time point T1. The first reception circuit 112 of the first antenna circuit 110 may operate after being delayed by the first reception circuit latency T_rx1 from the first time point T1. The second reception circuit 122 of the second antenna circuit 120 may operate after being delayed by the second reception circuit latency T_rx2 from the second time point T2.

The first reception circuit 112 may measure a first measurement time period T_m1, which is a time required to send the first signal to the first reception circuit 112 after the first signal reaches the second antenna circuit 120 from the first transmission circuit 111, by receiving the first signal reflected from the second antenna circuit 120.

At the same time, the second reception circuit 122 of the second antenna circuit 120 may measure a second measurement time period T_m2, which is a time required for the first signal to transmit from the first transmission circuit 111 to the second reception circuit 122, by receiving the first signal.

The first reception circuit 112 and the second reception circuit 122 may transmit the first measurement time period T_m1 and the second measurement time period T_m2 to the controller 130.

Referring to FIGS. 9 to 11 and 12B, the second transmission circuit 121 may transmit, to the first antenna circuit 110, a second signal delayed by the second transmission circuit latency T_tx2 from the second time point T2. The second reception circuit 122 of the second antenna circuit 120 may operate after being delayed by the second reception circuit latency T_rx2 from the second time point T2. The first reception circuit 112 of the first antenna circuit 110 may operate after being is delayed by the first reception circuit latency T_rx1 from the first time point T1.

The second reception circuit 122 may measure a third measurement time period T_m3, which is a time required to send the second signal to the second reception circuit 122 after the second signal reaches the first antenna circuit 110 from the second transmission circuit 121, by receiving the second signal reflected from the first antenna circuit 110.

At the same time, the first reception circuit 112 of the first antenna circuit 110 may measure a fourth measurement time period T_m4, which is a time required for the second signal to transmit from the second transmission circuit 121 to the first reception circuit 112, by receiving the second signal.

The first reception circuit 112 and the second reception circuit 122 may transmit the third measurement time period T_m3 and the fourth measurement time period T_m4 to the controller 130.

The controller 130 may obtain theoretical time periods, which are values derived theoretically from a time required to send signals between the antenna circuits 110 and 120, based on an interval between the antenna circuits 110 and 120, and shapes of the antenna circuits 110 and 120.

For example, the controller 130 may obtain the first theoretical time period, which is a theoretical value derived from a time required to send the first signal to the first reception circuit 112 after the first signal reaches the first transmission circuit 111 to the second antenna circuit 120.

For example, the controller 130 may obtain the second theoretical time period, which is a theoretical value derived from a time required to send the first signal from the first transmission circuit 111 to the second reception circuit 122.

The controller 130 may calculate the latencies T_tx1, T_rx1, T_tx2, and T_rx2 of the transmission circuits 111 and 121 and the reception circuits 121 and 122 based on a first theoretical time period, a second theoretical time period, the first measurement time period T_m1, the second measurement time period T_m2, the third measurement time period T_m3, and the fourth measurement time period T_m4.

For example, the controller 130 may calculate the latencies T_tx1, T_rx1, T_tx2, and T_rx2 of the transmission circuits 111 and 121 and the reception circuits 121 and 122 based on Equations 1 to 4 below.

$$T\_tx1 + T\_c1 = T\_rx1 + T\_m1 \quad \text{[Equation 1]}$$

$$T\_tx1 + T\_c2 = T\_syncdiff + T\_rx2 + T\_m2 \quad \text{[Equation 2]}$$

$$T\_syncdiff + T\_tx2 + T\_c1 = T\_syncdiff + T\_rx1 + T\_m3 \quad \text{[Equation 3]}$$

$$T\_syncdiff + T\_tx2 + T\_c2 = T\_rx1 + T\_m4 \quad \text{[Equation 4]}$$

Here, T_tx1 denotes a first transmission circuit latency, T_rx1 denotes a first reception circuit latency, T_tx2 denotes a second transmission circuit latency, T_rx2 denotes a second reception circuit latency, T_c1 denotes a first theoretical time period, T_c2 denotes a second theoretical time period, and T_syncdiff denotes a synchronization signal error between the first antenna circuit and the second antenna circuit.

Figure 13:
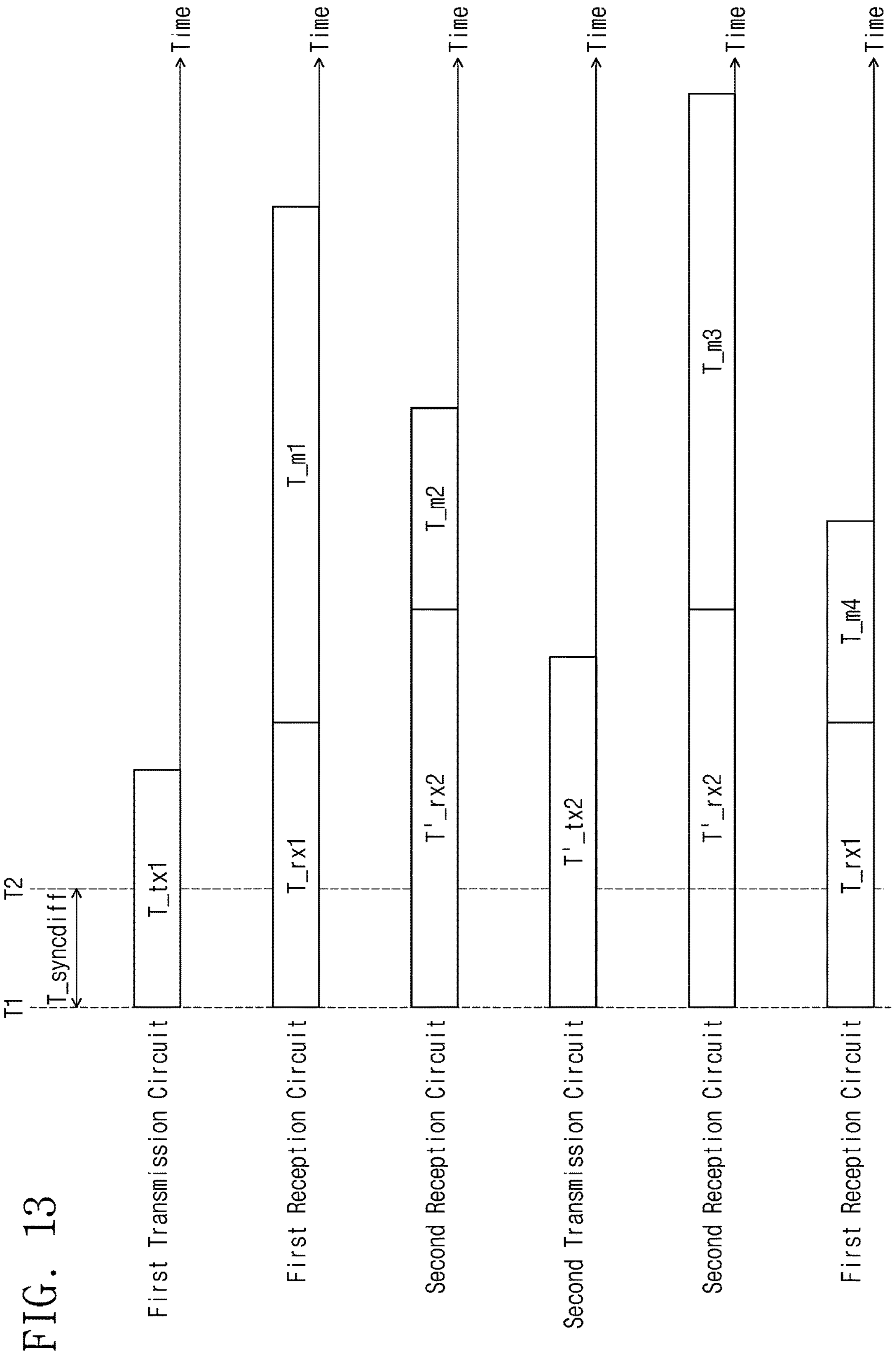
FIG. 13 shows an example of an operation in which a UWB radar device calculates latencies, according to an embodiment of the present disclosure.

FIG. 13 shows an example of an operation in which the UWB radar device 100 calculates latencies T_tx1, T_rx1, T'_tx2, and T'_rx2, according to an embodiment of the present disclosure. In FIG. 13, it is assumed that the controller 130 receives measurement time periods T_m1 to T_m4 from the antenna circuits 110 and 120 and obtains a first theoretical time period and a second theoretical time period.

Referring to FIGS. 1 and 9 to 13, the controller 130 may calculate the latencies T_tx1, T_rx1, T'_tx2, and T'_rx2 based on Equations 5 to 7 below.

$$T\_syncdiff + T\_rx2 = T'\_rx2, \quad \text{[Equation 5]}$$

$$T\_syncdiff + T\_tx2 = T'\_tx2 \quad \text{[Equation 6]}$$

$$T\_syncdiff + T\_rx1 = T'\_rx1 \quad \text{[Equation 7]}$$

(Here, T'_rx2 denotes the modified second reception circuit latency, T'_tx2 denotes the modified second transmission circuit latency, and T'_rx1 denotes the modified first reception circuit latency)

Equations 1 to 7 may be summarized as Equations 8 to 11 below.

$$T\_tx1 + T\_c1 = T\_rx1 + T\_m1 \quad \text{[Equation 8]}$$

$$T\_tx1 + T\_c2 = T'\_rx2 + Tm2 \quad \text{[Equation 9]}$$

$$T'\_tx2 + T\_c1 + T'\_rx1 + T\_m3 \quad \text{[Equation 10]}$$

$$T'\_tx2 + T\_c2 = T\_rx1 + T\_m4 \quad \text{[Equation 11]}$$

In other words, the controller 130 may calculate the first transmission circuit latency T_tx1, the first reception circuit latency T_rx1, the modified second transmission circuit latency T'_tx1, and the modified second reception circuit latency T'_rx2 based on Equations 8 to 11. The controller 130 may detect a synchronization error between the first antenna circuit 110 and the second antenna circuit 120 based on the calculated latencies T_tx1, T_rx1, T'_tx1, and T'_rx2. In an embodiment, the controller 130 may store the calculated latencies T_tx1, T_rx1, T'_tx1, and T'_rx2 and the synchronization error in a memory (not shown).

Figure 14:
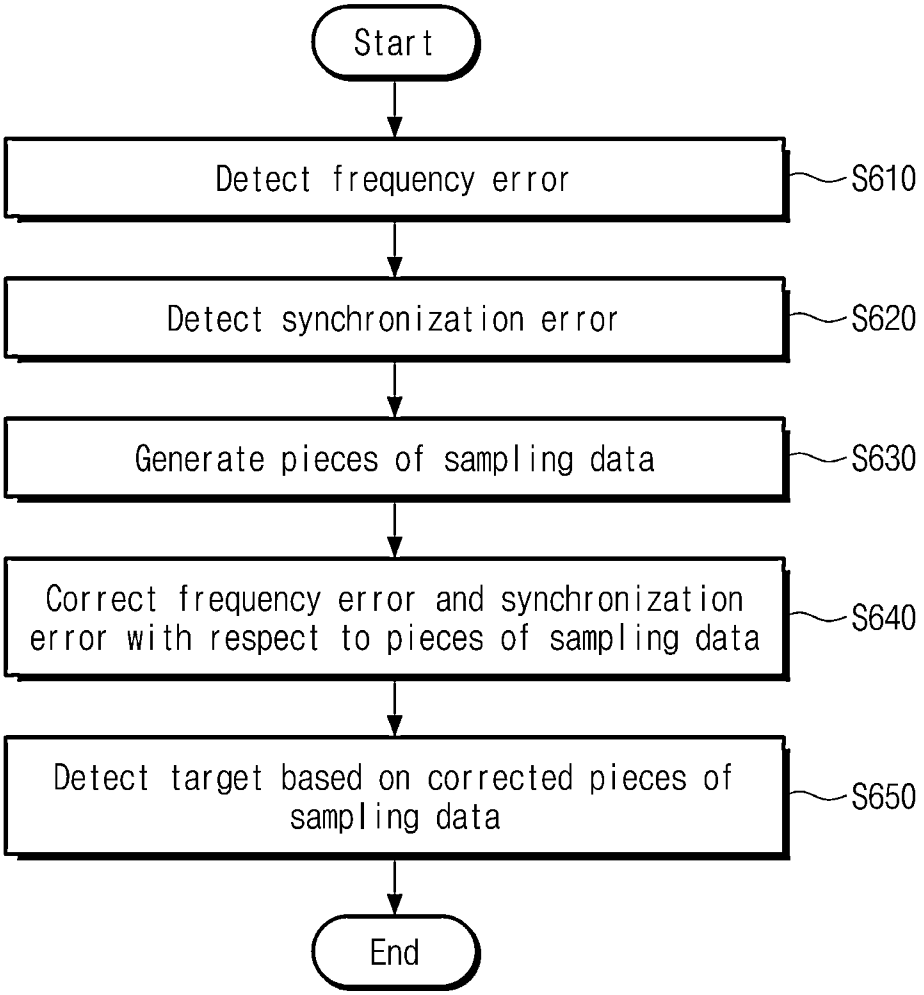
FIG. 14 shows an example of a method of operating a UWB radar device, according to an embodiment of the present disclosure.

FIG. 14 shows an example of a method of operating the UWB radar device 100, according to an embodiment of the present disclosure. Referring to FIGS. 1 and 14, the UWB radar device 100 may perform operations S610 to S650.

In operation S610, the UWB radar device 100 may detect a frequency error between a first clock signal and a second clock signal. For example, the UWB radar device 100 may obtain first frequency data based on the first clock signal and may obtain second frequency data based on the second clock signal. The UWB radar device 100 may detect a frequency error based on the obtained first frequency data and the obtained second frequency data.

In operation S620, the UWB radar device 100 may detect a synchronization error between the first antenna circuit 110 and the second antenna circuit 120. For example, the UWB radar device 100 may calculate latencies of the transmission circuits 111 and 121 and the reception circuits 112 and 122 and may detect the synchronization error based on the latencies.

In operation S630, the UWB radar device 100 may generate pieces of sampling data. For example, the first antenna circuit 110 may generate pieces of first sampling data based on the synchronization signal. The second antenna circuit 120 may generate pieces of second sampling data based on the synchronization signal.

In operation S640, the UWB radar device 100 may correct a frequency error and a synchronization error with respect to the pieces of sampling data. For example, the UWB radar device 100 may interpolate the pieces of second sampling data in a time domain as much as the frequency error to correct the frequency error. The UWB radar device 100 may correct the pieces of first sampling data and the pieces of second sampling data based on latencies calculated to correct the synchronization error.

In operation S650, the UWB radar device 100 may detect a target based on the corrected pieces of sampling data.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

The above-mentioned description refers to embodiments for implementing the scope of the present disclosure. Embodiments in which a design is changed simply or which are easily changed may be included in the scope of the present disclosure as well as an embodiment described above. In addition, technologies that are easily changed and implemented by using the above-mentioned embodiments may be also included in the scope of the present disclosure.

According to an embodiment of the present disclosure, a sampling frequency error and a synchronization error between antenna circuits of UWB radar may be corrected.

According to an embodiment of the present disclosure, UWB radar with an equivalently large area may be implemented through antenna circuits having ease mobility, and high spatial resolution may be implemented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An ultra-wide band (UWB) radar device comprising:

a first antenna circuit including a first transmission circuit configured to transmit a first signal to a target based on a synchronization signal, a first reception circuit configured to generate pieces of first sampling data from the first signal reflected from the target, a first oscillator configured to supply a first clock signal to the first transmission circuit and the first reception circuit, and a first frequency counter configured to obtain first frequency data of the first clock signal;

a second antenna circuit including a second transmission circuit configured to transmit a second signal to the target based on the synchronization signal, a second reception circuit configured to generate pieces of second sampling data from the second signal reflected from the target, a second oscillator configured to supply a second clock signal to the second transmission circuit and the second reception circuit, and a second frequency counter configured to obtain second frequency data of the second clock signal; and a controller configured to generate the synchronization signal and to detect the target based on the pieces of first sampling data and the pieces of second sampling data, wherein the controller is configured to:

correct a frequency error between the first clock signal and the second clock signal; and compensate for a synchronization error between the first antenna circuit and the second antenna circuit.

2. The UWB radar device of claim 1, wherein the controller detects the frequency error and the synchronization error before the pieces of first sampling data and the pieces of second sampling data are generated.

3. The UWB radar device of claim 2, wherein the first frequency counter obtains the first frequency data by counting the number of pulses of the first clock signal, wherein the second frequency counter obtains the second frequency data by counting the number of pulses of the second clock signal, and wherein the controller detects the frequency error based on the first frequency data and the second frequency data.

4. The UWB radar device of claim 3, wherein the controller interpolates the pieces of second sampling data in a time domain by the detected frequency error to correct the frequency error.

5. The UWB radar device of claim 3, wherein the controller generates a first enable signal and a second enable signal to control the first frequency counter and the second frequency counter, wherein the first frequency counter counts the number of pulses of the first clock signal when the first enable signal is at a high level, and wherein the second frequency counter counts the number of pulses of the second clock signal when the second enable signal is at a high level.

6. The UWB radar device of claim 2, wherein the controller detects the synchronization error by rotating the first antenna and the second antenna circuit to face each other.

7. The UWB radar device of claim 6, wherein the controller is configured to:

calculate latencies of the first transmission circuit, the first reception circuit, the second transmission circuit and the second reception circuit; and detect the synchronization error based on the latencies.

8. The UWB radar device of claim 7, wherein the controller calculates the latencies based on a first theoretical time period, a second theoretical time period, a first measurement time period, a second measurement time period, a third measurement time period, and a fourth measurement time period, wherein the first theoretical time period is a value derived from a time required to transmit the first signal to the first reception circuit after the first signal reaches the second antenna circuit from the first transmission circuit, wherein the second theoretical time period is a value derived from a time required to transmit the first signal from the first transmission circuit to the second reception circuit, wherein the first measurement time period is a value obtained by measuring a time required to transmit the first signal to the first reception circuit after the first signal reaches the second antenna circuit from the first transmission circuit, wherein the second theoretical time period is a value obtained by measuring a time required to transmit the first signal from the first transmission circuit to the second reception circuit, wherein the third measurement time period is a value obtained by measuring a time required to transmit the second signal to the second reception circuit after the second signal reaches the first antenna circuit from the second transmission circuit, and wherein the fourth measurement time period is a value obtained by measuring a time required to transmit the second signal from the second transmission circuit to the first reception circuit.

9. The UWB radar device of claim 8, wherein the controller calculates the latencies based on $$T\_tx1 + T\_c1 = T\_rx1 + T\_m1, \quad \text{Equation 1}$$

$$T\_tx1 + T\_c2 = T\_syncdiff + T\_rx2 + T\_m2, \quad \text{Equation 2}$$

$$T\_syncdiff + T\_tx2 + T\_c1 = T\_syncdiff + T\_rx1 + T\_m3, \text{ and} \quad \text{Equation 3}$$

$$T\_syncdiff + T\_tx2 + T\_c2 = T\_rx1 + T\_m4, \quad \text{Equation 4}$$

and wherein the T_tx1 denotes a latency of the first transmission circuit, the T_rx1 denotes a latency of the first reception circuit, the T_tx2 denotes a latency of the second transmission circuit, the T_rx2 denotes a latency of the second reception circuit, the T_c1 denotes a first theoretical time period, the T_c2 denotes a second theoretical time period, the T_m1 denotes a first measurement time period, the T_m2 denotes a second measurement time period, the T_m3 denotes a third measurement time period, the T_m4 denotes a fourth measurement time period, and the T_syncdiff denotes a synchronization signal error between the first antenna circuit and the second antenna circuit.

10. The UWB radar device of claim 9, wherein the controller calculates the latencies based on $$T\_syncdiff + T\_rx2 = T'\_rx2, \quad \text{Equation 5}$$

$$T\_syncdiff + T\_tx2 = T'\_tx2, \text{ and} \quad \text{Equation 6}$$

$$T\_syncdiff + T\_rx1 = T'\_rx1, \quad \text{Equation 7}$$

and wherein the T' rx2 denotes a modified second reception circuit latency, the T'_tx2 denotes a modified second transmission circuit latency, and the T'_rx1 denotes a modified first reception circuit latency.

11. The UWB radar device of claim 10, wherein the controller corrects the pieces of first sampling data and the pieces of second sampling data based on the latencies calculated to correct the synchronization error.

12. A method of operating a UWB radar device, the method comprising:

detecting, by a controller, a frequency error between a first clock signal of a first antenna circuit and a second clock signal of a second antenna circuit;

detecting, by the controller, a synchronization error between the first antenna circuit and the second antenna circuit;

generating, by the first antenna circuit and the second antenna circuit, pieces of first sampling data and pieces of second sampling data; and correcting, by the controller, the frequency error and the synchronization error with respect to the pieces of first sampling data and the pieces of second sampling data.

13. The method of claim 12, wherein the detecting, by the controller, of the frequency error between the first clock signal of the first antenna circuit and the second clock signal of the second antenna circuit includes:

obtaining, by a first frequency counter of the first antenna circuit, first frequency data by counting the number of pulses of the first clock signal;

obtaining, by a second frequency counter of the second antenna circuit, second frequency data by counting the number of pulses of the second clock signal; and detecting, by the controller, the frequency error based on the first frequency data and the second frequency data.

14. The method of claim 13, wherein the correcting, by the controller, of the frequency error and the synchronization error with respect to the pieces of first sampling data and the pieces of second sampling data includes:

interpolating, by the controller, the pieces of second sampling data in a time domain by the detected frequency error to correct the frequency error.

15. The method of claim 12, wherein the detecting, by the controller, of the synchronization error between the first antenna circuit and the second antenna circuit includes:

rotating, by the controller, the first antenna circuit and the second antenna circuit to face each other.

16. The method of claim 15, wherein the first antenna circuit includes a first transmission circuit and a first reception circuit, wherein the second antenna circuit includes a second transmission circuit and a second reception circuit, and wherein the detecting of the synchronization error between the first antenna circuit and the second antenna circuit includes:

calculating, by the controller, latencies of the first transmission circuit, the first reception circuit, the second transmission circuit and the second reception circuit.

17. The method of claim 16, wherein the calculating, by the controller, of the latencies of the first transmission circuit, the first reception circuit, the second transmission circuit, and the second reception circuit includes:

calculating, by the controller, the latencies based on a first theoretical time period, a second theoretical time period, a first measurement time period, a second measurement time period, a third measurement time period, and a fourth measurement time period, wherein the first theoretical time period is a value derived from a time required to transmit a first signal to the first reception circuit after the first signal reaches the second antenna circuit from the first transmission circuit, wherein the second theoretical time period is a value derived from a time required to transmit the first signal from the first transmission circuit to the second reception circuit, wherein the first measurement time period is a value obtained by measuring a time required to transmit the first signal to the first reception circuit after the first signal reaches the second antenna circuit from the first transmission circuit, wherein the second theoretical time period is a value obtained by measuring a time required to transmit the first signal from the first transmission circuit to the second reception circuit, wherein the third measurement time period is a value obtained by measuring a time required to transmit a second signal to the second reception circuit after the second signal reaches the first antenna circuit from the second transmission circuit, and wherein the fourth measurement time period is a value obtained by measuring a time required to transmit the second signal from the second transmission circuit to the first reception circuit.

18. The method of claim 17, wherein the controller calculates the latencies based on $$T\_tx1 + T\_c1 = T\_rx1 + T\_m1, \quad \text{Equation 1}$$

$$T\_tx1 + T\_c2 = T\_syncdiff + T\_rx2 + T\_m2, \quad \text{Equation 2}$$

$$T\_syncdiff + T\_tx2 + T\_c1 = T\_syncdiff + T\_rx1 + T\_m3, \text{ and} \quad \text{Equation 3}$$

$$T\_syncdiff + T\_tx2 + T\_c2 = T\_rx1 + T\_m4, \quad \text{Equation 4}$$

and wherein the T_tx1 denotes a latency of the first transmission circuit, the T_rx1 denotes a latency of the first reception circuit, the T_tx2 denotes a latency of the second transmission circuit, the T_rx2 denotes a latency of the second reception circuit, the T_c1 denotes a first theoretical time period, the T_c2 denotes a second theoretical time period, the T_m1 denotes a first measurement time period, the T_m2 denotes a second measurement time period, the T_m3 denotes a third measurement time period, the T_m4 denotes a fourth measurement time period, and the T_syncdiff denotes a synchronization signal error between the first antenna circuit and the second antenna circuit.

19. The method of claim 18, wherein the controller calculates the latencies based on $$T\_syncdiff + T\_rx2 = T'\_rx2, \quad \text{Equation 5}$$

$$T\_syncdiff + T\_tx2 = T'\_tx2, \text{ and} \quad \text{Equation 6}$$

$$T\_syncdiff + T\_rx1 = T'\_rx1, \quad \text{Equation 7}$$

and wherein the T'_rx2 denotes a modified second reception circuit latency, the T'_tx2 denotes a modified second transmission circuit latency, and the T'_rx1 denotes a modified first reception circuit latency.

20. The method of claim 19, wherein the correcting of the frequency error and the synchronization error with respect to the pieces of first sampling data and the pieces of second sampling data includes:

correcting, by the controller, the pieces of first sampling data and the pieces of second sampling data based on the latencies calculated to correct the synchronization error.

* * * * *